United States Patent
Scheit et al.

(10) Patent No.: US 9,270,215 B2
(45) Date of Patent: Feb. 23, 2016

(54) METHOD AND DEVICE FOR COMPENSATING FOR LOAD FACTORS IN PERMANENTLY EXCITED MOTORS

(75) Inventors: Alexander Scheit, Oder (DE); Horst-Günter Seelig, Oder (DE)

(73) Assignee: Elmos Semiconductor AG, Dortmund (DE)

(*) Notice: Subject to any disclaimer, the term of this patent is extended or adjusted under 35 U.S.C. 154(b) by 1096 days.

(21) Appl. No.: 13/380,101

(22) PCT Filed: Jun. 22, 2010

(86) PCT No.: PCT/EP2010/058820
§ 371 (c)(1),
(2), (4) Date: Mar. 17, 2012

(87) PCT Pub. No.: WO2010/149656
PCT Pub. Date: Dec. 29, 2010

(65) Prior Publication Data
US 2012/0169260 A1    Jul. 5, 2012

(30) Foreign Application Priority Data
Jun. 23, 2009 (DE) .................. 10 2009 030 884

(51) Int. Cl.
*H02P 23/12* (2006.01)
*H02P 6/18* (2006.01)

(52) U.S. Cl.
CPC ............ *H02P 6/185* (2013.01); *H02P 2203/01* (2013.01)

(58) Field of Classification Search
CPC .... H02P 1/00; H02P 2201/00; H02P 2203/00
See application file for complete search history.

(56) References Cited

U.S. PATENT DOCUMENTS 5,254,914 A    10/1993    Dunfield
5,280,222 A    1/1994    von der Heide et al.
(Continued)

FOREIGN PATENT DOCUMENTS

| DE | 4090927 | * | 9/2006 |
| DE | 4090927 B4 | | 9/2006 |
| EP | 1 133 050 A2 | | 9/2001 |
| JP | 2002165482 A | | 6/2002 |

OTHER PUBLICATIONS

Zhu Z. Q. et al.: Compensation for rotor position estimation error due to cross-coupling magnetic saturation in signal injection based sensorless control of PM brushless AC motors; Electric Machines & Drives Proceedings, 2007, IEEE, vol. 1, pp. 208-213; May 5, 2007.
(Continued)

*Primary Examiner* — Shawki S Ismail
*Assistant Examiner* — Zoheb Imtiaz
(74) *Attorney, Agent, or Firm* — Gudrun E. Huckett

(57) ABSTRACT

The invention relates methods and devices for compensating for load factors in permanently excited motors, wherein the rotor position is determined from the inductivities of the phases. The methods and devices are characterized by a stabilization of the inductivity-based signals for the determination of the position of the rotor in permanently excited motors against load factors. To this end, advantageously current-dependent faults of the angular values determined during the operation of the motor are corrected. For this purpose, in order to correct the inductivity-based determination of the position of the rotor, in a measuring device either the phase currents are measured or the intermediate circuit current is captured. Furthermore, including at least one motor-specific characteristic value, at least one current-dependent correction value, which is determined from said characteristic value, is applied in a correction device against the inductivity-based signals, which result from the inductivity-based determination of the position of the rotor, of a device for determining the inductivities such that switch states, which are loaded with the correction value by a control device and thus are corrected, are present at a converter for actuating the motor.

6 Claims, 1 Drawing Sheet

(56) References Cited

U.S. PATENT DOCUMENTS

| | | |
|---|---|---|
| 2004/0249596 A1 | 12/2004 | Ho |
| 2007/0085508 A1* | 4/2007 | Fujitsuna ............... H02P 6/185 318/712 |
| 2007/0252587 A1* | 11/2007 | Stauder ............... G01D 5/2006 324/207.15 |
| 2008/0048606 A1 | 2/2008 | Tobari et al. |
| 2008/0129243 A1 | 6/2008 | Nashiki |

OTHER PUBLICATIONS

Bianchi N. et al.: Comparison of PM motor structures and sensorless control techniques for zero speed rotor position detection; Power Electronics, IEEE Transaction; 2007; IEEE, vol. 22, pp. 2466-2475; Nov. 12, 2007.

* cited by examiner

METHOD AND DEVICE FOR COMPENSATING FOR LOAD FACTORS IN PERMANENTLY EXCITED MOTORS

BACKGROUND OF THE INVENTION

The invention concerns methods and devices for compensation of load factors in permanently excited motors wherein the rotor position is determined based on the inductivities of the phases.

Permanently excited synchronous machines (PMSM) and brushless direct current motors (BLDC) are comprised of a stator and a rotor with magnets. The individual phases of the stator are connected in a star connection or delta connection. The motor is operated with a converter. These motors require control electronics for determining the rotor position and for supplying current to the individual phases.

The rotor position can be detected by means of sensors. Inter alia, Hall sensors are employed. Sensors require mounting space and cause higher system costs.

In order to avoid these disadvantages, control methods without sensors are employed. They can be classified roughly into two groups.

One group employs the voltage that is induced by movement within the phases. The system-caused disadvantage resides in the lack of positional information at standstill.

The second group is based on the variation of the stator inductivities. The saturation of the stator inductivity is affected by the rotor field of the permanent magnets and the current-caused stator field.

The inductivity of a coil in the currentless state is proportional to the relative permeability. As a result of the saturation effects that occur in the core, with increasing field strength the relative permeability drops or, stated differently, the magnetic resistance increases. In this connection, only the absolute value but not the direction is decisive. Thus, a rotor position-dependent function of the inductivity for a BLDC motor results. When the motor has three phases, the functions are displaced relative to each other by 60 electrical degrees. In the currentless state, the north and the south poles of the rotor magnets have the same effect. Therefore, these functions of the inductivities have twice the periodicity relative to the electrical period. This ambiguity must be resolved for a complete position information. A current-excited field is superimposed on the stator field. In this way, the saturation in the motor is either enlarged or reduced and the corresponding inductivity is thus reduced or enlarged. This effect affects also the angle determination in case of useful current feed of the motor and causes a faulty determination of the rotor position.

The invention has the object to stabilize the inductivity-based signals for positional determination of the rotor in permanently excited motors with respect to load factors.

SUMMARY OF THE INVENTION

This object is solved for the method in accordance with the invention in that for correction of the inductivity-based rotational position of the rotor in a measuring device either the phase currents are measured or the intermediate circuit current is detected and in that, taking into account at least one motor-specific characteristic value, at least one corrective value determined based thereon is linked in a correction device with the inductivity-based signals of a device for detection of the inductivities, which signals result from the inductivity-based rotational position of the rotor, so that by means of a control unit switch states, subjected to the corrective value and thus corrected, are supplied to a converter for controlling the motor. The object is further solved for the device in that the measuring device for either the phase currents or for the intermediate circuit current as well as the device for determining the inductivities are connected with the correction device, in that the correction device is a correction device that, taking into account at least one motor-specific characteristic value, determines based thereon at least one corrective value and links this corrective value with the inductivity-based signal resulting from the inductivity-based position determination, and in that the control unit is connected either with the correction device or with the correction device in combination with a determination device and, in this way, corrected switch states are supplied to the converter for the motor.

The methods and devices for compensation of load factors in permanently excited motors, wherein the rotor position is determined based on the inductivities of the phases or their relations, are characterized by a stabilization of the inductivity-based signals for positional determination of the rotor in permanently excited motors relative to load factors. In this connection, advantageously current-dependent errors of the angle values determined during motor operation are corrected.

For this purpose, for correction of the inductivity-based positional determination of a rotor in a measuring device, either the phase currents are measured or the intermediate circuit current is detected. Preferably, for this purpose a measuring resistor is used in the measuring device. Moreover, taking into account at least one motor-specific characteristic value, at least one current-dependent corrective value that is derived therefrom is computationally applied in a correction device to the inductivity-based signals of a device for determining the inductivities, which signals result from the inductivity-based positional determination of the rotor, so that, by means of a control unit switch states that are subjected to the corrective value and are thus corrected are supplied to a converter for controlling the motor.

For this purpose, in the device the measuring device for either the phase currents or the intermediate circuit current as well as the device for determining the inductivities are connected to the correction device of the inductivity-based positional determination. In this context, the correction device is a correction device that, taking into account at least one motor-specific characteristic value, determines at least one corrective value therefrom and links this corrective value with the angle that results from the inductivity-based positional determination. Moreover, the control unit is connected with a correction device or with a correction device in combination with a determination device, wherein switch states that are subjected to, the corrective value and are thus corrected are supplied to the converter for the motor.

The invention concerns methods and devices for compensation of load factors in permanently excited motors, wherein the rotor position is determined based on the inductivities of the phases.

Inductivities are determined as is known in the art:
- by determination of the current change rate (dI/dt) for direct measurement of the phase currents or the intermediate circuit current and consideration of the BEMF (Back ElectroMotive Force—back EMF or back induction voltage) and motor voltage;
- by measuring the star point potential of motors that are star-connected and the thus resulting calculation of the ratiometric inductive ratios of the motor; or
- by supplying high frequency voltages and direct measurement of the magnetic resistances.

In this context, with the method and the device, current-dependent errors of the angle values determined during motor operation are advantageously corrected.

The described method and the device compensate the load factors in permanently excited motors. This leads to a stabilization of the employed inductivity-based signals. The system becomes thus more robust with respect to load factors.

The effect of reducing the signal strength can be reduced by the method. A possible faulty jump of the rotor position detection by 180 electrical degrees is safely prevented.

The correction of the faulty inductivity-based signals enables a more precise rotor position detection. The motor is controlled more efficiently.

Advantageous embodiments of the invention are disclosed in claims 2 to 11 and 13 to 16.

The control unit according to the embodiments of claims 2 and 13 is a control unit for a predetermined operation of the motor. In this connection, in the control unit for this purpose the required pulse width modulation (PWM) pattern for the converter is determined by using the corrected angle value φcorr, wherein
- the inductivity-based signal φ is calculated based on the measured inductivities or the relations between the inductivities and they represent the faulty position of the rotor;
- in the correction device a current-dependent correction is carried out; and
- the control unit controls the converter and thus the motor.

According to the embodiment of claim 3, in addition the effects on the inductivities of the motor are determined motor-specifically as a function for the correlation between the angle value and either the phase currents or the intermediate circuit current for the correction device
- experimentally without knowledge of the construction of the motor by means of several measurements of the inductivities or their relations at different conditions; or
- analytically/simulatively by analysis of the motor construction.

The correction of the angle error is based on this function.

An experimental determination is realized advantageously on test stands with several measurements.

The analysis of the motor construction on the basis of the finite element method (FEM) enables also the determination of the corrective parameters. The process models derived therefrom are comprised of complex functions of higher order. As a result of the greater mathematical degree of freedom, these corrective functions can be more efficiently matched to the target motor.

The motor specific characteristic value is determined according to the embodiment of claim 4 automatically upon starting the motor, wherein
- the motor is supplied with current;
- the inductivity-based signals are measured for at least two different motor currents;
- the thus resulting angle values are determined based on the inductivities; and
- the current-dependent corrective function is determined in a device for determining the corrective function.

Accordingly, an at least linear corrective value is present.

An automatic determination has the advantage that it is carried out during operation so that therefore exemplar-based differences can be taken into consideration. Moreover, it is self-compensating and enables in this way technical solutions that can be created independent of the motor. The product can thus be used in various applications. This leads to a reduction of the system costs.

The time for measuring the inductivities, according to the embodiment of claims 5 and 10, is smaller than the mechanical time constant of the motor. In this way, a false function as a result of a possible movement of the motor is avoided.

According to the embodiment of claim 6, the inductivities are measured for different currents and negligible movement of the motor. Moreover, the correlation between the calculated angle value and the currents is calculated wherein the corrective value is a constant in the simplest case.

The control unit according to the embodiments of claims 7 and 15 is a control unit for a predetermined operation of the motor.

In the control unit the required pulse width modulation (PWM) pattern for the converter by using the corrected rotor position φcorr is determined for this purpose, wherein
- the inductivity-based signals $L_U$, $L_V$, and $L_W$ are measured and the measured values represent the faulty position of the rotor;
- in the correction device current-dependent and rotor position-dependent corrective values are determined and in a control loop with a determination device, based on the signals $L_{U\,corr}$, $L_{V\,corr}$, and $L_{W\,corr}$ corrected therewith, the rotor position φcorr corrected by the load factors is determined; and
- the control unit controls the converter and thus the motor.

This enables a more precise correction of the angle values because special features of the angle functions based on which the inductivities behave can be detected with this arrangement.

With the embodiment of claim 8 additionally the effects on the inductivities of the motor as motor-specific functions for the correlation between the angle values represented by the inductivity-based signals and either the phase currents or the intermediate circuit current for the correction device are determined either experimentally without knowledge of the construction of the motor by means of several measurements of the inductivities at different conditions or analytically/simulatively by analysis of the motor construction. The correction of the inductivity-based signals is based on the functions in this context.

The motor-specific characteristic values according to the embodiment of claim 9 are automatically determined upon starting the motor, wherein
- the motor is supplied with current;
- the inductivity-based signals are measured at least at two different motor currents;
- the angle values are calculated based on the inductivity-based signals; and the current-dependent corrective functions are determined.

In this way, at least linear corrective values by means of a device for determining the corrective functions are present.

The inductivities according to the embodiment of claim 11 are measured at different currents and negligible movement of the motor. The correlation between the inductivity-based angle-representing signals and the currents is furthermore determined wherein the corrective values are constants in the simplest case.

The correction device according to the embodiment of claim 14 is moreover connected to a device for determining the corrective function wherein the device automatically modifies the motor voltage and thus the current of the motor. Moreover, the device is connected to the correction device so that, based on the inductivity-based position signal and the motor currents, the corrective functions can be determined.

The correction device according to the embodiment of claim 16 is moreover connected with a device for determining the corrective functions wherein the motor voltage and thus the motor current are modified. The device is moreover connected to the correction device so that, based on the inductivity-based position signals and the motor currents, the corrective functions can be determined.

BRIEF DESCRIPTION OF THE DRAWINGS

Embodiments of the invention are illustrated in principle in the drawings, respectively, and will be explained in more detail in the following.

It is shown in.

DESCRIPTION OF THE PREFERRED EMBODIMENTS

In the embodiments, a method and a device are explained jointly, respectively, in more detail.

Considering first the currentless state of a BLDC motor. The inductivity of a coil is proportional to the relative permeability. As a result of the saturation effects that occur in the core, with increasing field strength the relative permeability drops or, expressed differently, the magnetic resistance increases. In this context, only the absolute value but not the direction is decisive. When applying this knowledge to a BLDC motor, a rotor position-dependent function of the inductivity results. When the motor has three phases, the functions are displaced relative to each another by 120 electrical degrees. They have relative to the electrical revolution twice the periodicity. A minimum occurs when a north pole or south pole is opposite the pole shoe of the phase.

In the second characteristic position the absolute value of the field strength in the phases U and W is identical but the directions of the fields are different. The inductivities are identical in the currentless state. The radial flux in the phase V is zero. The inductivity V is the greatest. In this consideration, the variation of the air gap is neglected.

When the motor is supplied with current, the fields of the rotor and of the stator are superposed.

A system which determines a rotor position on the basis of these changed inductivities would generate false commutation. This error must be compensated. Without compensation of this angle error, this effect can lead to a severe problem. The variation of the inductivities can be suppressed. The system is no longer capable of determining the rotor position correctly. It will continue to drift farther and farther. The stator field reduces the total field in the coil and the variation of the inductivities decreases until no variation can be detected anymore. Moreover, the motor is not operated at the optimal working point.

1st Embodiment

In a first method for compensating load factors in permanently excited motors 3, wherein the rotor position is determined based on the inductivities of the phases, the load factors are compensated in the determination of the rotor position by means of a first device.

Figure 1:
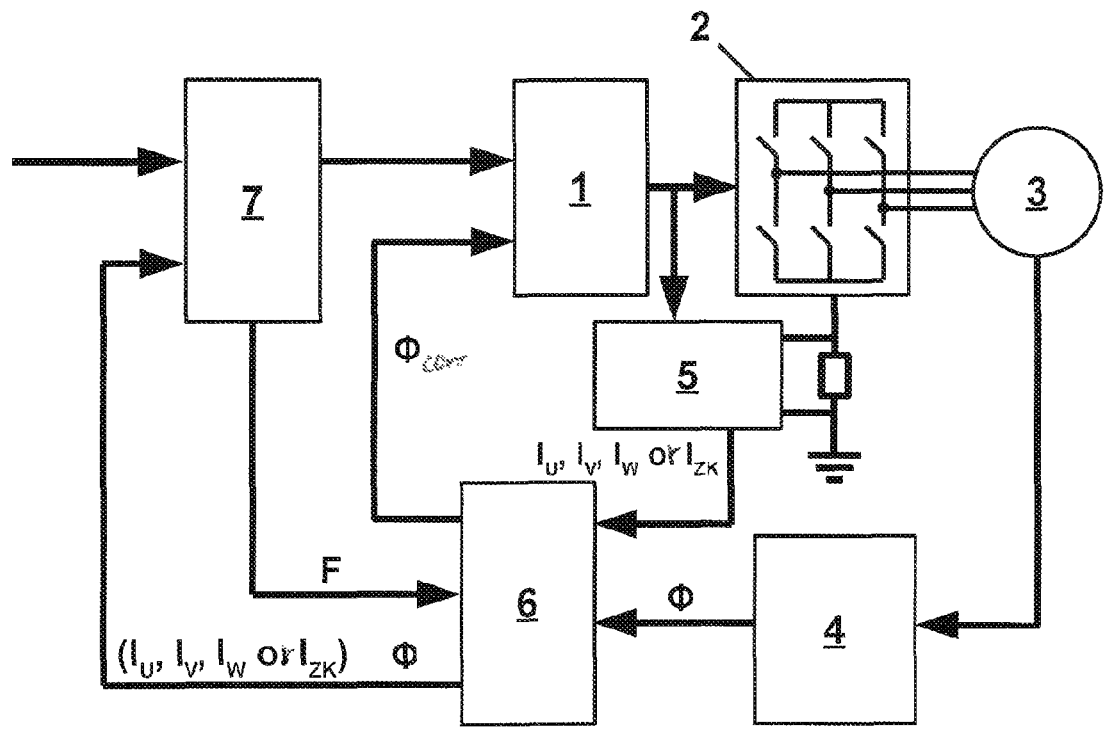
FIG. 1 a device for compensation of load factors on the rotor position detection in permanently excited motors.

FIG. 1 shows in principle a device for compensation of load factors in permanently excited motors.

The device is comprised substantially of a control unit 1, a converter 2 for the permanently excited motor 3, a device 4 for determining the inductivities, a measuring device 5, and a correction device 6.

The measuring device 5 as well as the device 4 for determining the inductivities are connected to the correction device 6 of the inductivity-based positional determination.

The measuring device 5 determines the intermediate circuit current or the phase currents. Preferably, for this purpose a measuring resistor is used. Based on these currents and at least one motor-specific characteristic value, the correction device 6 determines at least one corrective value that is linked to the inductivity-based signals that result from the inductivity-based positional determination.

In the simplest case, the current $I_{ZK}$ is multiplied by a constant K and subtracted from the detected rotor position $$\phi corr = \phi - F, \text{ wherein } F = I_{ZK} * K.$$

The constant K is motor-specifically determinable. Experimentally, by means of several measurements the reactions of the inductivities in response to load factors are examined at different conditions. A further possibility is provided by the analysis or simulation of the motor construction. It is possible to determine more complex corrective functions of higher order.

The motor-specific corrective value can also be determined automatically upon starting the motor. The device 7 controls the process and determines the corrective value. The motor 3 is supplied with current, the inductivities are measured, and the angle is calculated. The time span in which the arrangement measures the required values is smaller than the mechanical time constant of the system. The otherwise possible movement of the motor would falsify the measurements.

The correction device 6 is a correction device 6 that, taking into account at least one motor-specific characteristic value, determines based thereon a corrective value; the corrective value is linked with the inductivity-based signals resulting from the inductivity-based positional determination. The correction device 6 is moreover connected to the control unit 1 wherein switch states that are subjected to the corrective value and are thus corrected are supplied to the converter 2 for the motor 3.

2nd Embodiment

In a second method for compensation of load factors in permanently excited motors 3, wherein the rotor position is determined based on the inductivities of the phases, the load factors in the determination of the rotor position are compensated by means of a second device. In order to compensate the current-based systematic error, an intervention in the sensor-free method is required. The inductivity-based signals are subjected to the corrective values $L_{U\,corr}$, $L_{V\,corr}$, and $L_{W\,corr}$. The thus obtained signals are subsequently handed over to the sensor-free method.

Figure 2:
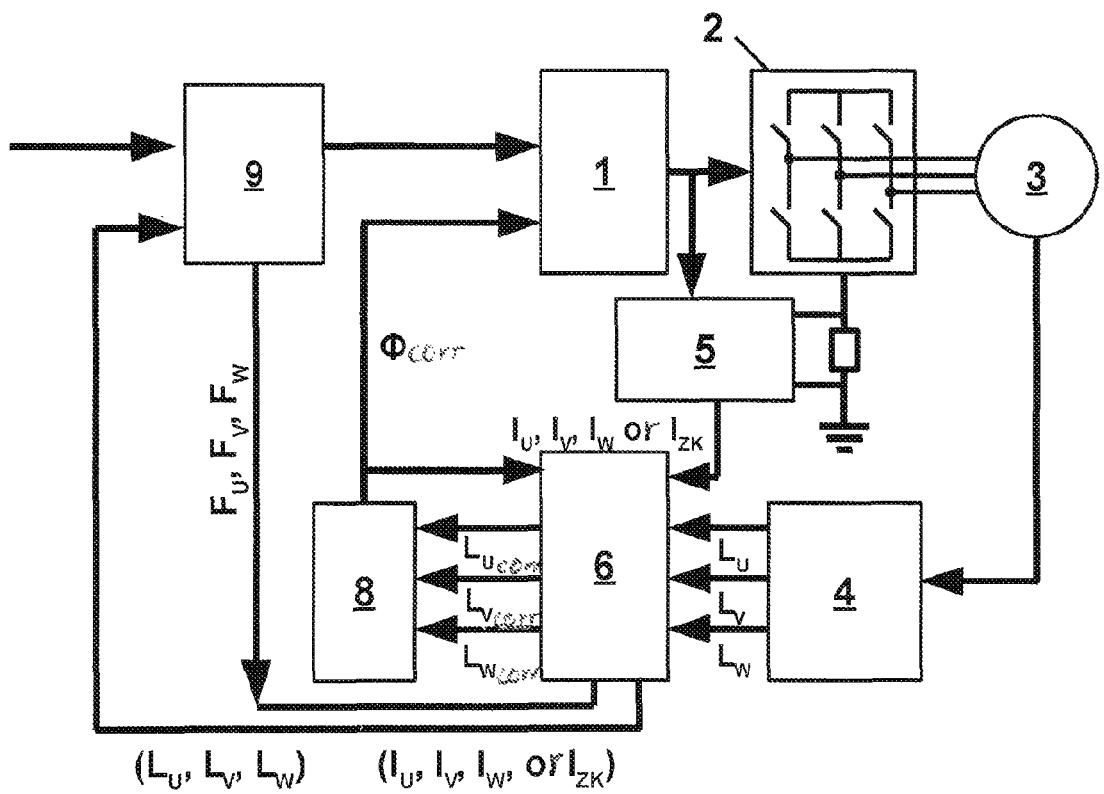
FIG. 2 a device for compensation of load factors on the inductivity-based signals of a rotor position determination in permanently excited motors.

FIG. 2 shows such a device for compensation of load factors on the inductivity-based signals of a rotor position determination in permanently excited motors 3 in principle.

The control unit 1 obtains by means of an external system a default for motor operation. It calculates based thereon the required PWM pattern for the converter 2. The latter supplies current to the motor 3. The measuring arrangement 4 generates the inductivity-based signals $L_U$, $L_V$, and $L_W$ that contain an error proportion.

The correction is realized in that the current-dependent and rotor position-dependent corrective values $K_U$, $K_V$, and $K_W$ are subtracted from the signals. For this purpose, the electrical period of the motor is divided into six segments. These segments have assigned different values for $K_U$, $K_V$, and $K_W$. The values are saved in a table.

$$L_{U\,corr} = L_U - F_U \text{ wherein } F_U = I_{ZK} * K_U$$

$$L_{V\,corr} = L_V - F_V \text{ wherein } F_V = I_{ZK} * K_V$$

$$L_{W\,corr} = L_W - F_W \text{ wherein } F_W = I_{ZK} * K_W$$

Subsequently, the thus prepared or processed signals $L_{U corr}$, $L_{V corr}$, and $L_{W corr}$ are handed over to the device 7 for rotor position detection. In the latter, the rotor position that is corrected by the load factors is determined. On the basis of this information, the control unit 1 can thus operate the motor 3 in a robust fashion.

The constants $K_U$, $K_V$ and $K_W$ are motor-specific and must be determined. This can be done by analysis of the motor construction or by measurements.

These values can also be calculated automatically upon starting the motor. For this purpose, the motor 3 is supplied with current and the change of the inductivities at various motor currents is measured.

The time interval in which the arrangement determines the required values is smaller than the mechanical time constant so that a possible movement of the rotor is avoided.

The device 5 for correction ensures that the signals do not drop below a minimum amplitude. For this purpose, the useful current feed is rotated in the direction of late commutation and/or the current is limited.

For this purpose, a device for compensation of load factors in permanently excited motors 3, wherein the rotor position is determined based on the inductivities of the phases, is comprised substantially of a control unit 1, a converter 2 for the motor 3, a device 4 for determining the inductivities, a measuring device 5, a correction device 6, and a device 8 for determining the motor position.

The measuring device 5 for the phase currents or an intermediate circuit current as well as the device 4 for determining the inductivities are connected with the correction device 6 of the inductivity-based positional determination.

The correction device 6 is a correction device 6 that subtracts current-dependent and motor position-dependent corrective values inductivity-based signals $L_U$, $L_V$, and $L_W$ generated from the position of the rotor. Moreover, the correction device 6 is connected by means of a device 8 for determining the rotor position with the control unit 1 wherein, based on the corrected signals $L_{U corr}$, $L_{V corr}$, and $L_{W corr}$, the rotor position is detected and the rotor position ϕcorr corrected by the load factors is determined and the converter 2 and thus the motor 3 are controlled. The device 8 for determining the rotor position is also connected with the correction device 6 so that the respective corrected signals $L_{U corr}$, $L_{V corr}$, and $L_{W corr}$ are determined taking into account the respective corrected rotor position ϕcorr. In this way, the operation of the motor 3 is matched to the respective actual operating condition. The corrected signals are determined based on the inductivity-based signals $L_U$, $L_V$, and $L_W$ as well as based on the constants as a function of the phase currents and the corrected rotor position ϕcorr.

What is claimed is:

1. A device for compensation of load factors in a brushless direct current motor (BLDC) comprised of a stator and a rotor with magnets, wherein the individual phases of the stator are connected in a star connection or delta connection, wherein a rotor position of the rotor is determined based on inductivities of the phases or relations of the phases the device for compensation of load factors comprising:
    a measuring device that measures either the phase currents or an intermediate circuit current;
    a device that is connected to the motor and determines inductivities representing faulty positions of the rotor and generates inductivity-based signals $L_u$, $L_v$, and $L_w$;
    a correction device that, taking into account motor-specific characteristic values, determines based on the motor-specific characteristic values current-dependent corrective values $K_u$, $K_v$, and $K_w$ and links the corrective values $K_u$, $K_v$, and $K_w$ with the inductivity-based signals $L_u$, $L_v$, and $L_w$ resulting from inductivity-based position determination;
    wherein the measuring device and the device that determines inductivities are connected to the correction device;
    wherein the motor-specific characteristic values for the correction device are determined motor-specifically based on effects of the inductivities of the motor as a function for a correlation between the angle value and either the phase currents or the intermediate circuit current
    experimentally without knowledge of the construction of the motor; or
    analytically/simulatively by analysis of the motor construction; or
    automatically upon starting the motor;
    a control unit that provides a required pulse width modulation (PWM) pattern for a predetermined operation of the motor;
    a converter connected to the control unit downstream of the control unit;
    wherein the correction device determines corrected inductivity-based signals $$L_{U\,corr}=L_U-F_U \text{ wherein } F_U=I_{ZK}*K_U$$

$$L_{V\,corr}=L_V-F_V \text{ wherein } F_V=I_{ZK}*K_V$$

$$L_{W\,corr}=L_W-F_W \text{ wherein } F_W=I_{ZK}*K_W$$

based on dividing the electrical period of the motor into six segments and assigning different values for $K_U$, $K_V$, and $K_W$ and saving the values in a table;
    wherein the device for compensation of load factors determines a corrected rotor position ϕcorr by using the measured inductivities of the motor representing the faulty position of the rotor and by correcting the measured inductivities so that switch states, corrected by the control unit based on the corrective value, are supplied to the converter for controlling the motor.

2. A device according to claim 1, wherein the correction device moreover is connected with a device that determines a corrective function, wherein the device that determines a corrective function automatically modifies a motor voltage and thus a motor current, wherein the device that determines a corrective function is connected to the correction device so that, based on the inductivity-based position signal and the motor currents, the corrective function can be determined.

3. A device according to claim 1, wherein the correction device is connected to a determination device as a control loop so that the corrected rotor position ϕcorr, corrected by the load factors, is obtained from the control loop and is determined based on the corrected signals $L_U$ corr, $L_V$ corr, and $L_W$ corr.

4. A device according to claim 1, wherein the correction device is connected furthermore with a device for determining corrective functions, wherein a motor voltage and thus a motor current is modified, and wherein the device for determining corrective functions is connected with the correction device so that based on the inductivity-based position signals and the motor currents the corrective functions can be determined.

5. The device according to claim 2, wherein the control unit is connected through the measuring device and the correction device to the device that determines a corrective function for automatically determining the motor-specific characteristic value upon starting the motor, wherein:

the motor is supplied with current,
the inductivity-based signals are measured at least for two different
motor currents,
the resulting angle values based are determined based on the
inductivities, and
the current-dependent corrective function is determined in the device
for determining the corrective function,
so that an at least linear corrective value is present.

6. The device according to claim 2, wherein the control unit is connected through the measuring device and the correction device to the device that determines a corrective function for automatically determining the motor-specific characteristic value upon starting the motor, wherein the inductivities are measured at different currents and negligible movement of the motor and the correlation between the calculated angle value and currents is calculated wherein the corrective value in the simplest case is a constant.

* * * * *